US011869522B2

(12) United States Patent
Abildgren et al.

(10) Patent No.: US 11,869,522 B2
(45) Date of Patent: Jan. 9, 2024

(54) ROBUST RETRANSMISSION TOPOLOGIES USING ERROR CORRECTION

(71) Applicant: Bose Corporation, Framingham, MA (US)

(72) Inventors: Rasmus Abildgren, Skørping (DK); Casper Stork Bonde, Støvring (DK)

(73) Assignee: Bose Corporation, Framingham, MA (US)

( * ) Notice: Subject to any disclaimer, the term of this patent is extended or adjusted under 35 U.S.C. 154(b) by 313 days.

(21) Appl. No.: 17/366,613

(22) Filed: Jul. 2, 2021

(65) Prior Publication Data
US 2023/0005492 A1    Jan. 5, 2023

(51) Int. Cl.
| | | |
|---|---|---|
| *H04B 7/00* | (2006.01) | |
| *G10L 19/16* | (2013.01) | |
| *G10L 19/005* | (2013.01) | |
| *G10L 19/008* | (2013.01) | |
| *H04L 9/08* | (2006.01) | |
| *H04S 1/00* | (2006.01) | |

(Continued)

(52) U.S. Cl.
CPC .......... *G10L 19/167* (2013.01); *G10L 19/005* (2013.01); *G10L 19/008* (2013.01); *H04L 9/088* (2013.01); *H04S 1/007* (2013.01); *H04W 56/001* (2013.01); *H04W 4/80* (2018.02)

(58) Field of Classification Search
CPC ... G10L 19/167; G10L 19/005; G10L 19/008; H04H 20/88; H04H 20/89; H04H 60/00; H04H 60/76
See application file for complete search history.

(56) References Cited

U.S. PATENT DOCUMENTS 11,026,028 B2 *   6/2021   Schmidt ................. H04B 1/713
11,558,155 B2 *   1/2023   Linsky ...................... H04L 1/22
(Continued)

FOREIGN PATENT DOCUMENTS

WO    2021/202290 A1   10/2021

OTHER PUBLICATIONS

International Search Report and the Written Opinion of the International Searching Authority, PCT Application No. PCT/US2022/073248, pp. 1-12, dated Oct. 14, 2022.

(Continued)

*Primary Examiner* — Tuan Pham
(74) *Attorney, Agent, or Firm* — Bond, Schoeneck & King, PLLC

(57) ABSTRACT

Methods and systems for improving the robustness of wireless communications. The methods and systems provided transmit data packets over a first isochronous stream and transmit one or more supplemental data packets over the same time intervals. The one or more supplemental data packets are used to re-create and/or enhance at least a portion of one or more data packets of the plurality of data packets that have already been sent. Alternatively, the one or more supplemental data packets are used to create and/or enhance at least a portion of one or more data packets of the plurality of data packets that will be received during the next isochronous intervals. The methods and system described herein allow for increased robustness by allowing for better retransmission with correctly received packets and the methods set forth herein work with any Bluetooth broadcaster sink without modification.

22 Claims, 8 Drawing Sheets

(51) Int. Cl.
*H04W 56/00* (2009.01)
*H04W 4/80* (2018.01)

(56) References Cited

U.S. PATENT DOCUMENTS

| | | |
|---|---|---|
| 2011/0149967 A1* | 6/2011 | Chen ................ H04L 12/40013 |
| | | 370/392 |
| 2017/0303076 A1 | 10/2017 | Song et al. |
| 2019/0246221 A1 | 8/2019 | Shariati |
| 2020/0106552 A1 | 4/2020 | Paycher et al. |

OTHER PUBLICATIONS

Wooley, Martin, "Bluetooth Core Specification Version 5.2 Feature Overview", Dec. 9, 2020, Section 3, retrieved from the internet: URL: https://www.bluetooth.com/wp-content/uploads/2020/01/Bluetooth_5.2_Feature_Overview.pdf.

* cited by examiner

ROBUST RETRANSMISSION TOPOLOGIES USING ERROR CORRECTION

BACKGROUND

Aspects and implementations of the present disclosure are generally directed to systems and methods for sending and receiving wireless data streams, e.g., sending and receiving wireless data streams between wireless devices.

Wireless systems, for example, wireless multi-speaker systems, wireless headphones or headsets, or any system that includes a broadcasting device and a receiving device, typically send and receive a stream of data packets within the wireless connection between the devices of the system. Wireless devices can experience losses over the wireless connection, e.g., packet losses, failed transmissions, and failed retransmissions when the connection is at the edge of its link budget or where interference is present. For example, should the wireless devices of the system be moved away from each other, so as to increase the distance between a source and a sink device, there will come a point where the distance between the devices will cause increased packet loss. Similarly, in circumstances where the devices of the system are subject to other forms of environmental interference, e.g., the existence of the plurality of other wireless communications in the vicinity, the presence of an object (e.g., a user's body, or wall) between the devices that could reduce signal strength, the link budget will be strained and will eventually experience decreases in quality.

SUMMARY OF THE DISCLOSURE

The present disclosure provides methods and systems for improving the robustness of wireless communications. The methods and systems provided transmit data packets over a first isochronous stream and transmit one or more supplemental data packets over the same time intervals. The one or more supplemental data packets are used to re-create and/or enhance at least a portion of one or more data packets of the plurality of data packets that have already been sent. Alternatively, the one or more supplemental data packets are used to create and/or enhance at least a portion of one or more data packets of the plurality of data packets that will be received during the next isochronous intervals. The methods and system described herein allow for increased robustness by allowing for better retransmission with correctly received packets and the methods set forth herein work with any Bluetooth broadcaster sink without modification.

The present disclosure includes broadcasting audio data over a first isochronous stream while also broadcasting a separate data stream that includes error correcting code for the audio stream. The configurations described herein allow each sink device to utilize correctly received packets from the audio stream in combination with error correction code to calculate missing audio data. Alternatively, the separate data stream can include additional audio data to enhance the quality of data already received. For example, the sink devices can utilize correctly received packets or at least a portion of correctly received packets (e.g., one or more frames of audio data) to calculate a missing portion of a packet or an entire missing packet.

The present systems and methods can utilize hard or soft block codes and the error correction codes can be calculated based on discrete left and right channel audio streams. Furthermore, error correction codes can be sent before the transmission of one or more of the packets utilized to calculate a given error correction code packet or can be sent well after the transmission of any such packets (e.g., pre or post transmissions). Additionally, the concepts described herein can be extended to non-broadcast scenarios, e.g., when utilizing connected isochronous streams.

In one example, a method of improving wireless communications, the method including: transmitting a plurality of data packets within a first isochronous interval of an isochronous stream; and transmitting one or more supplemental data packets within the first isochronous interval, wherein the transmitting of the one or more supplemental data packets is shifted with respect to at least one of time or frequency relative to the transmitting of the plurality of data packets; wherein the one or more supplemental data packets are used to at least one of create, re-create, or enhance at least a portion of one or more data packets of the isochronous stream.

In one aspect, the one or more supplemental data packets received during the first isochronous interval are used to at least one of create or enhance at least a portion of the one or more data packets of the plurality of data packets that will be received during the first isochronous interval or during a second isochronous interval after the first isochronous interval.

In one aspect, the one or more supplemental data packets are used to re-create at least a portion of one or more data packets of the plurality of the data packets and wherein the one or more supplemental data packets include error correcting code related to at least one packet of the plurality of data packets.

In one aspect, the error correcting code is related to at least one packet from the plurality of data packets received within the first isochronous interval and is related to at least one packet from the plurality of data packets sent during a second isochronous interval after the first isochronous interval.

In one aspect, each of the plurality of data packets includes one or more audio frames of encoded audio data and wherein the one or more supplemental data packets are used to re-create at least one audio frame of the one or more audio frames.

In one aspect, the plurality of data packets includes a first plurality of data packets associated with a left-channel audio stream and a second plurality of data packets associated with a right-channel audio stream and wherein a first supplemental data packet of the one or more supplemental data packets is related to the first plurality of data packets and a second supplemental data packet of the one or more supplemental data packets is related to the second plurality of data packets.

In one aspect, the one or more supplemental data packets are used to enhance at least a portion of one or more data packets of the plurality of the data packets and wherein the one or more supplemental data packets include additional data related to at least one packet of the plurality of data packets.

In one aspect, the isochronous stream is a broadcast isochronous stream or a connected isochronous stream.

In one aspect, the isochronous stream is a connected isochronous stream, and wherein the method further includes: acknowledging a successful recovery of one or more of the plurality of data packets based on the one or more supplemental data packets.

In one aspect, the one or more supplemental data packets are sent within the isochronous stream or within another isochronous stream that is time-related to the isochronous stream.

In one aspect, the one or more supplemental data packets are encrypted using a first encryption key pair and wherein the one or more supplemental data packets are encrypted using a second encryption key pair different than the first encryption key pair.

In another example, system for of improving wireless communications is provided, the system including: a source device configured to: transmit, to at least one sink device, a plurality of data packets within a first isochronous interval of an isochronous stream; and transmit one or more supplemental data packets to the at least one sink device within the first isochronous interval, wherein the transmission of the one or more supplemental data packets is shifted with respect to at least one of time or frequency relative to the transmission of the plurality of data packets; wherein the one or more supplemental data packets are used to at least one of create, re-create, or enhance at least a portion of one or more data packets of the isochronous stream.

In one aspect, the one or more supplemental data packets received during the first isochronous interval are used to at least one of create or enhance at least a portion of the one or more data packets of the plurality of data packets that will be received during the first isochronous interval or during a second isochronous interval after the first isochronous interval.

In one aspect, the one or more supplemental data packets are used to re-create at least a portion of one or more data packets of the plurality of the data packets and wherein the one or more supplemental data packets include error correcting code related to at least one packet of the plurality of data packets.

In one aspect, the error correcting code is related to at least one packet from the plurality of data packets received within the first isochronous interval and is related to at least one packet from the plurality of data packets sent during a second isochronous interval after the first isochronous interval.

In one aspect, each of the plurality of data packets includes one or more audio frames of encoded audio data and wherein the one or more supplemental data packets are used to re-create at least one audio frame of the one or more audio frames.

In one aspect, the plurality of data packets includes a first plurality of data packets associated with a left-channel audio stream and a second plurality of data packets associated with a right-channel audio stream and wherein a first supplemental data packet of the one or more supplemental data packets is related to the first plurality of data packets and a second supplemental data packet of the one or more supplemental data packets is related to the second plurality of data packets.

In one aspect, the one or more supplemental data packets are used to enhance at least a portion of one or more data packets of the plurality of the data packets and wherein the one or more supplemental data packets include additional data related to at least one packet of the plurality of data packets.

In one aspect, the isochronous stream is a broadcast isochronous stream or a connected isochronous stream.

In one aspect, the isochronous stream is a connected isochronous stream, and wherein the source device is further configured to acknowledge a successful recovery of one or more of the plurality of data packets based on the one or more supplemental data packets.

In one aspect, the one or more supplemental data packets are sent within the isochronous stream or within another isochronous stream that is time-related to the isochronous stream.

In one aspect, the one or more supplemental data packets are encrypted using a first encryption key pair and wherein the one or more supplemental data packets are encrypted using a second encryption key pair different than the first encryption key pair.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure provides methods and systems for improving the robustness of wireless communications. The methods and systems provided transmit data packets over a first isochronous stream and transmit one or more supplemental data packets over the same time intervals. The one or more supplemental data packets are used to re-create and/or enhance at least a portion of one or more data packets of the plurality of data packets that have already been sent. Alternatively, the one or more supplemental data packets are used to create and/or enhance at least a portion of one or more data packets of the plurality of data packets that will be received during the next isochronous intervals. The methods and system described herein allow for increased robustness by allowing for better retransmission with correctly received packets and the methods set forth herein work with any Bluetooth broadcaster sink without modification.

By way of example, in the context of LE Audio, the broadcast topology, there is no feedback mechanism to the broadcasting device (or source device) with information from the receiving device(s) (or sink device(s)). Therefore, the broadcasting device does not know whether packets were received by the receiving device(s), and thus, the broadcasting device defaults to providing equal priority to all packets and uses the same amount of bandwidth for each packet. However, in a bandwidth constrained broadcast scenario, it is likely that the number of packets lost during the broadcasting is relatively high (and especially higher than what could have been achieved under the LE Audio unicast topology). Therefore, the present disclosure provides methods to significantly increase the retransmission effort with no to minimal bandwidth cost. Such retransmission improvements can provide up to a factor of eight over the retransmission cost used by the default Bluetooth Core 5.2 standard that defines the LE Audio broadcast topology. In addition, the techniques variously described herein allow devices that are not operating in such an improved manner to receive the broadcast stream but without the added robustness, thereby allowing receiving or sink devices that are operating under the default Bluetooth Core 5.2 LE Audio broadcast topology to still work with the techniques described herein.

Figure 1:
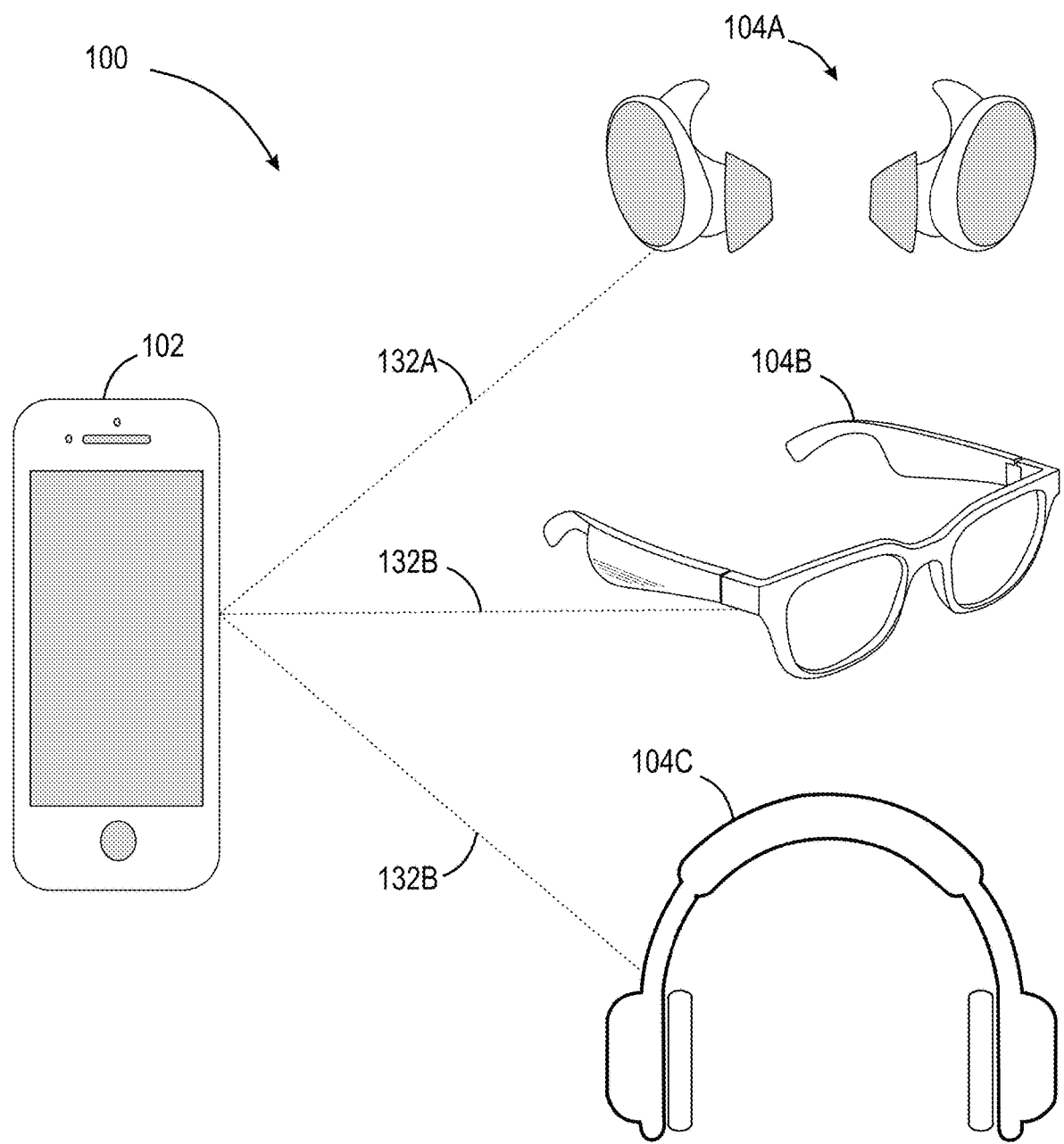
FIG. 1 is a schematic view of a system according to the present disclosure.

The term "wearable audio device" as used in this disclosure, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. While FIG. 1 shows examples of an in-the-ear headphone form factor, an eyeglass form factor, and an over-the-ear headset, in other examples the wearable audio device can be an on-ear, around-ear, behind-ear, or near-ear headset. In some examples, the wearable audio device can be an open-ear device that includes an acoustic driver to radiate acoustic energy towards the ear while leaving the ear open to its environment and surroundings.

The term "connected isochronous stream" as used in this disclosure, in addition to including its ordinary meaning or its meaning known to those skilled in the art, is intended to refer to an isochronous data stream which utilizes a preestablished, point-to-point communication link over LE Audio between, e.g., a source device (which may also be known as a central or master device) and an audio device or a plurality of audio devices (which may also be known as a peripheral or slave device(s)). In other words, a connected isochronous stream can provide an isochronous audio stream which utilizes at least one established reliable communication channel and/or at least one acknowledged communication channel between the source device and any respective audio devices.

The term "broadcast isochronous stream" as used in this application, in addition to including its ordinary meaning or its meaning known to those skilled in the art, is intended to refer to an isochronous data stream which does not require a preestablished communications link to be established between the source device sending data and the audio device receiving data and does not require acknowledgements or negative acknowledgements to be sent or received.

The following description should be read in view of FIGS. 1-8. FIG. 1 is a schematic view of the components of system 100 according to the present disclosure. In some examples, system 100 includes a source device 102 and at least one sink device 104. Additionally, in some examples as illustrated in FIG. 1, system 100 includes a plurality of sink devices 104A-104C (collectively referred to as "sink devices 104" or "plurality of sink devices 104"). Source device 102 is intended to be a device capable of establishing a wireless connection, e.g., wireless connection 132 (discussed below) with at least one sink device 104. Although illustrated as a smartphone, it should be appreciated that source device 102 can be selected from at least one of a tablet, a smarthub, media hub, a stereo hub, a soundbar, a headphone case, or any device capable of sending or broadcasting wireless data (discussed below) to the at least one sink device 104. Moreover, although illustrated as a pair of truly wireless earbuds 104A, an eyeglass form-factor device 104B, and an over-the-ear form-factor headset 104C, it should be appreciated that sink devices 104 can be selected from at least one of: a smartphone, a tablet, a smarthub, media hub, a stereo hub, a soundbar, a headphone case, or any device capable of receiving wireless data (discussed below) from the source device 102. In some examples, each sink device 104 is intended to be a device capable of rendering audible acoustic energy based on the wireless data received from the source device 102, e.g., rendering audio data. In some examples, as will be discuss below, the source device 102 is configured to send one or more supplemental packets 140 (discussed below) to each sink device 104 that can include error correcting code and/or additional code to recover and/or enhance the audio data prior to rendering.

Figure 2:
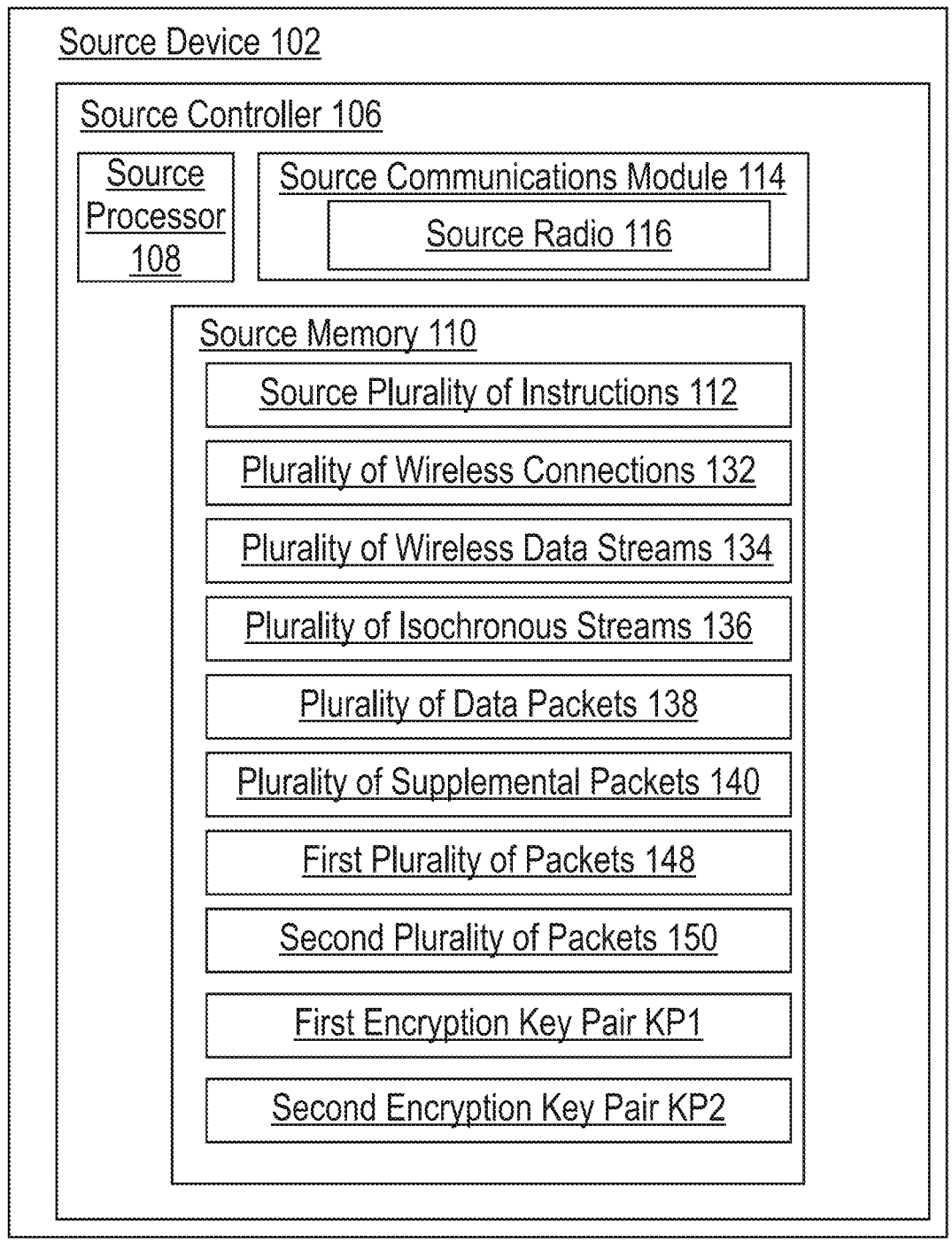
FIG. 2 is a schematic view of the components of a source device according to the present disclosure.

As illustrated schematically in FIG. 2, source device 102 includes a source controller 106 which includes a source processor 108 and a source memory 110 configured to execute and store, respectively, a plurality of non-transitory computer-readable source instructions 112, to perform the various functions of source device 102 as will be described herein. Source controller 106 also includes a source communications module 114 configured to send and/or receive wireless data, e.g., data relating to at least one of the plurality of wireless data streams discussed below, e.g., wireless connection 132. To that end, source communications module 114 can include at least one radio or antenna, e.g., source radio 116, capable of sending and receiving wireless data. In some examples, source communications module 114 can include, in addition to at least one radio (e.g., source radio 116), some form of automated gain control (AGC), a modulator and/or demodulator, and potentially a discrete processor for bit-processing that are electrically connected to source processor 108 and source memory 110 to aid in sending and/or receiving wireless data.

Figure 3:
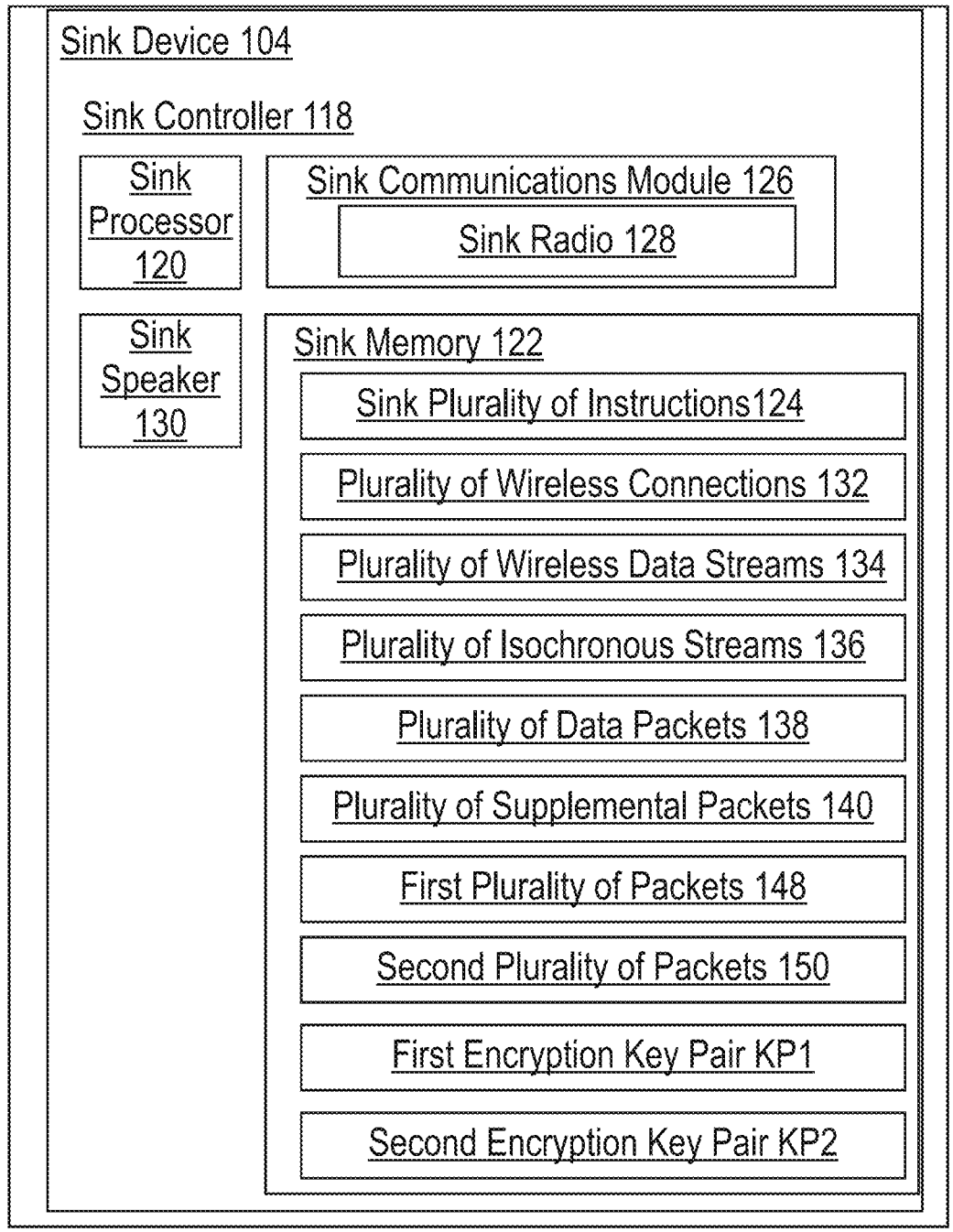
FIG. 3 is a schematic view of the components of a sink device according to the present disclosure.

As illustrated in FIG. 3, each sink device 104 can include a sink controller 118 which includes a sink processor 120 and a sink memory 122 configured to execute and store, respectively, a plurality of non-transitory computer-readable sink instructions 124, to perform the various functions of each sink device 104 as will be described herein. Each sink controller 118 also includes a sink communications module 126 configured to send and/or receive wireless data, e.g., data relating to at least one of the plurality of wireless data streams discussed below, e.g., wireless connection 132. To that end, each sink communications module 126 can include at least one radio or antenna, e.g., sink radio 128, capable of sending and receiving wireless data. In some examples, sink communications module 126 can include, in addition to at least one radio (e.g., sink radio 128), some form of automated gain control (AGC), a modulator and/or demodulator, and potentially a discrete processor for bit-processing that are electrically connected to sink processor 120 and sink memory 122 to aid in sending and/or receiving wireless data. As illustrated in FIG. 3, it should be appreciated that each sink device 104 can also include at least one speaker, i.e., sink speaker 130, which is, e.g., a loudspeaker or acoustic transducer, that is electrically connected to sink processor 120 and sink memory 122 and configured to electromechanically convert an electrical signal into audible acoustic energy within the environment surrounding each sink device, e.g., an audio playback. In some examples, the electrical signal and the audible acoustic energy are associated with the data included in the wireless connection 132 (discussed below). Furthermore, and although not illustrated, each sink controller 118 can include one or more clocks or time-keeping circuits configured to keep independent time during operation of system 100.

Each device of system 100, i.e., source device 102 and each sink device 104, can use their respective communication modules to establish one or more wireless connections 132A-132C (collectively referred to as "wireless connections 132") between the source device 102 and each sink device 104. Each wireless connection 132 can be used to send and/or receive wireless data via one or more wireless data streams between the source device 102 and each sink device 104. In some examples, each data stream is an isochronous data stream 136A-136C (collectively referred to as "isochronous data streams 136" or "isochronous streams 136"), e.g., a connected isochronous stream using LE Audio standard. In other examples, as will be described below, the isochronous data streams 136 are broadcast isochronous streams, e.g., where the source device 102 is configured to broadcast one or more isochronous streams 136 that are received by one or more sink devices 104. For example, source device 102 can be configured to generate, broadcast, or otherwise wirelessly transmit one or more wireless data streams that are received by each sink device 104. It should be appreciated that the streams established over each wireless connection 132 can use various wireless data protocols, standards, or methods of transmission e.g., Bluetooth Low-Energy Protocols, the Bluetooth Low-Energy ISO transport protocol or the LE Audio standard. In some examples, these protocols are used to send, receive, or otherwise transmit audio data, e.g., data used by sink devices 104 to generate audible acoustic energy in the form of an audio playback. However, it should be appreciated that these protocols are not limited to transmission of audio data and include other types of data.

As illustrated in FIGS. 4A-6, Each isochronous stream 136 includes one or more packets of a plurality of data packets 138A-138D (collectively referred to as "data packets 138") and/or one or more of a plurality of supplemental data packets 140A-140H (collectively referred to as "supplemental packets 140"). Data packets 138, as described herein, are sent by source device 102 to one or more sink devices 104, and can include data used by the one or more sink devices 104 to generate or render audible acoustic energy, e.g., an audio playback. In other words, data packets 138 can include audio data and/or one or more frames of audio data that can be used to generate audible acoustic energy using the sink speakers 130 of each sink device 104 discussed above. To that end, data packets 138 can be framed or unframed packets. For example, framed packets can include a header and a payload whereas unframed packets do not include the packet header. In some examples, the header can include fields for segmentation header data and time offset data while the payload includes the encoded wireless data to be transferred from one device to the other. For example, if the data to be transferred is audio data associated with one or more audio files, the payload can include audio data in the form of one or more frames of encoded audio data. In an unframed arrangement, during the initial negotiation of the wireless connections 132, the source controller 106 and each of the sink controllers 118 can negotiate and agree on the parameters normally specified in the header of each packet so that each device knows what type of data and what parameters will be used when sending and receiving the data, rendering the inclusion of the header redundant and not necessary.

Each supplemental packet 140, in addition to being framed or unframed, can include data intended to correct, recover, or enhance data sent within one or more of the plurality of data packets 138. For example, as will be discussed below in detail, each supplemental packet 140 can include error correcting code or error correction code intended to aid each sink device 104 in recovering or recreating at least a portion of one or more data packets 138 that were not successfully received from within the one or more isochronous streams 136. Alternatively or additionally, each supplemental data packet can include additional data related to one or more data packets 138 that were successfully received from the one or more isochronous streams 136 that can be used by each sink device 104 to enhance the data already received. For example, if the data packets 138 included audio data or frames of audio data encoded at a lower bitrate or lower quality (e.g., 72 kbps), the supplemental packets 140 could provide additional audio data (e.g., 72 kbps) that would effectively raise the bitrate and thus raise the quality of the audio decoded for each frame (to e.g., 144 kbps). It should be appreciated that, the supplemental packets 140 can be encrypted such that only authorized sink devices 104 can access the error correcting or enhancing capabilities afforded by the supplemental packets 140.

As will be described below, in some examples, the supplemental packets 140 include error correcting codes. In some examples, the error correcting codes can be selected from any hard decision block bodes, e.g., can be selected from at least one of: Reed-Solomon coding, Multidimensional parity, or Hamming codes. It should be appreciated that convolutional codes can also be used, however this will lead to a soft decision and may increase the error correcting performance at the cost of artifacts, e.g., audio artifacts when the soft decision leads to an incorrect result. Additionally, for the block codes chosen, the parity format used can be Redundant Array of Independent Disks (RAID) 5 and RAID 6 as they do not require significant memory and processing on the decoder side, e.g., at the sink controller 118 side.

Figure 4A:
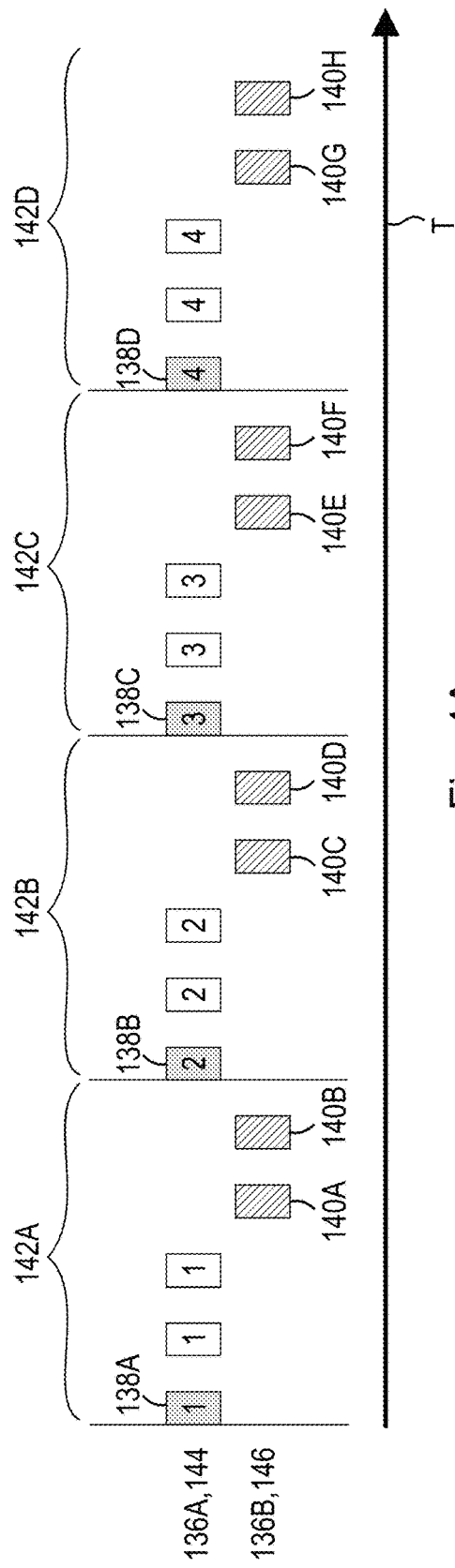
FIG. 4A is a schematic illustration of a wireless broadcast topology according to the present disclosure.

As shown in FIGS. 4A-6, which illustrates one example configuration, data packets 138 and supplemental packets 140 are sent via one or more isochronous streams, e.g., streams that send packets during predetermined isochronous time intervals along time T, e.g., isochronous intervals 142A-142D (collectively referred to as "isochronous intervals 142"). Each isochronous interval 142 can include a plurality of isochronous events and isochronous sub-events, which divide and sub-divide each Bluetooth isochronous interval based on the initial negotiation of a given wireless connection. Additionally, data packets 138 and supplemental packets 140 can be sent within the same isochronous stream 136 or within different isochronous streams 136, e.g., via different frequencies or channels. In one example, illustrated in FIG. 4A, data packets 138 are sent in a first isochronous stream 136A using a first frequency 144, while supplemental data packets 140 are sent in a second isochronous stream 136B which uses a second frequency 146 different than the first frequency 144. As shown in FIGS. 4A-4B, the supplemental packets 140 sent via the second isochronous stream 136B are temporally shifted with respect to the data packets 138 sent via the first isochronous stream 136A. Due to this temporal shift such that no overlap occurs between the packets of each respective stream, it should be appreciated that both the first isochronous stream 136A and the second isochronous stream 136B can both be generated by the same radio, e.g., source radio 116.

With specific reference to FIG. 4A, which illustrates one example of system 100, source device 102 is configured to send via a first broadcast isochronous stream 136A, and at a first frequency 144, a plurality of data packets 138A-138D. Additionally, source device 102 is also configured to send via a second broadcast isochronous stream 136B, at a second frequency 146 different from the first frequency 144, a plurality of supplemental data packets 140. Specifically, as illustrated, within the first isochronous interval 142A, the source device 102 is configured to send a first data packet 138A (shown schematically in FIG. 4A as a shaded square with the number "1" displayed thereon), and one or more retransmission packets that include an identical payload to first data packet 138A (shown schematically in FIG. 4A as white squares with the number "1" displayed thereon). Following the transmission of first data packet 138A and both of the retransmitted packets associated with first data packet 138A, and within the first broadcast isochronous stream 136A, source device 102 is also configured to transmit, via the second broadcast isochronous stream 136B, one or more supplemental packets 140, i.e., supplemental packets 140A and 140B. As discussed above, each of the supplemental packets 140A and 140B can contain error correcting code calculated based on one or more data packets 138 that can be used by one or more sink devices 104 to recover or re-create data packets 138. Alternatively, as discussed above, supplemental packets 140A and 140B can contain additional data, e.g., additional audio data or audio frames, used to enhance, or add to the data successfully obtained in, e.g., first data packet 138A. Furthermore, and similarly to the packets sent during the first isochronous interval 142A, source device 102 is configured to send a second data packet 138B, a third data packet 138C, and a fourth data packet 138D (all shown as shaded squares numbered 2-4, respectively, in FIG. 4A), during the second isochronous interval 142B, the third isochronous interval 142C, and the fourth isochronous interval 142D, respectively. Additionally, each respective packet can be followed by one or more retransmitted packets (shown as white squares number 2-4, respectively, in FIG. 4A). Also, within the second isochronous stream 136B, and during each isochronous interval 142, source device 102 is configured to send one or more supplemental packets 140, e.g., supplemental packets 140C and 140D during the second isochronous interval 142B, supplemental packets 140E and 140F during the third isochronous interval 142C, and supplemental packets 140G and 140H during the fourth isochronous interval 142D. Supplemental packets 140A-140H are illustrated as boxes with cross-hatchings. It should be appreciated that supplemental packets 140A-140H are also temporally shifted with respect to data packets 138 and their respective retransmitted packets such that no overlap between the data packets and the supplemental packets occur. Thus, a single radio, i.e., source radio 116, can broadcast data packets 138, the respective retransmitted packets associated with data packets 138, and the supplemental packets 140.

Figure 4B:
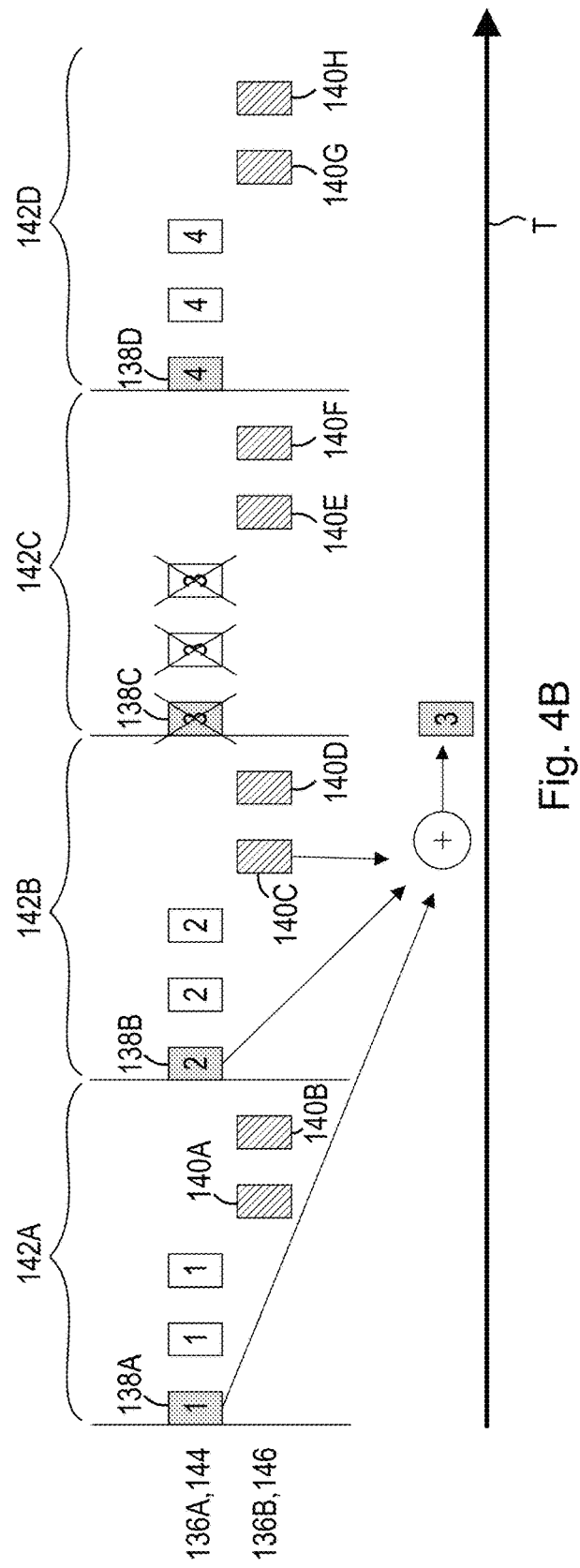
FIG. 4B is a schematic illustration of a wireless broadcast topology according to the present disclosure.

FIG. 4B illustrates one example of system 100 including recovery of a missing data packet using supplemental packets 140 with error correcting code. As shown, each supplemental packet 140 can include error correcting code calculated using data from one or more data packets 138A-138D. For example, as shown, first data packet 138A and second data packet 138B are successfully received, while third data packet 138C is lost (shown in FIG. 4B by a solid "X" over third data packet 138C and its respective retransmission packets). Additionally, supplemental packets 140A-140D are sent via a second broadcast isochronous stream 136B. Since supplemental packet 140C can include error correcting code calculated using data packets 138A-138B, the error correcting code of the supplemental data packet 140C can be used to calculate and recover the missing packet (e.g., 138C) and pass the data from the missing packet to the sink device 104 for use in decoding the first isochronous stream 136A. In other words, the error correcting code within supplemental packet 140C can re-create missing or lost data packet 138C using the data from first data packet 138A, second data packet 138B, and supplemental packet 140C (shown by arrows in FIG. 4B). It should be appreciated that the error correcting code within a given supplemental packet 140 can be calculated using one or more data packets 138. For example, although not illustrated, supplemental packet 140A and/or 140B can be calculated based on two data packets, i.e., first data packet 138A and second data packet 138B. Thus, should at least one of these data packets and one of the supplemental packets be successfully received, the missing data packet can be recovered. Additionally, it should be appreciated that, within the second isochronous stream 136B, multiple supplemental packets 140 are sent within a single isochronous interval, e.g., supplemental packets 140A and 140B are sent within the first isochronous interval 142A. In this example, supplemental packet 140A can include error correcting codes or additional data used to enhance one or more packets 138, while supplemental packet 140B is a retransmission of supplemental packet 140A, i.e., supplemental packet 140B has an identical payload to supplemental packet 140A.

Figure 5:
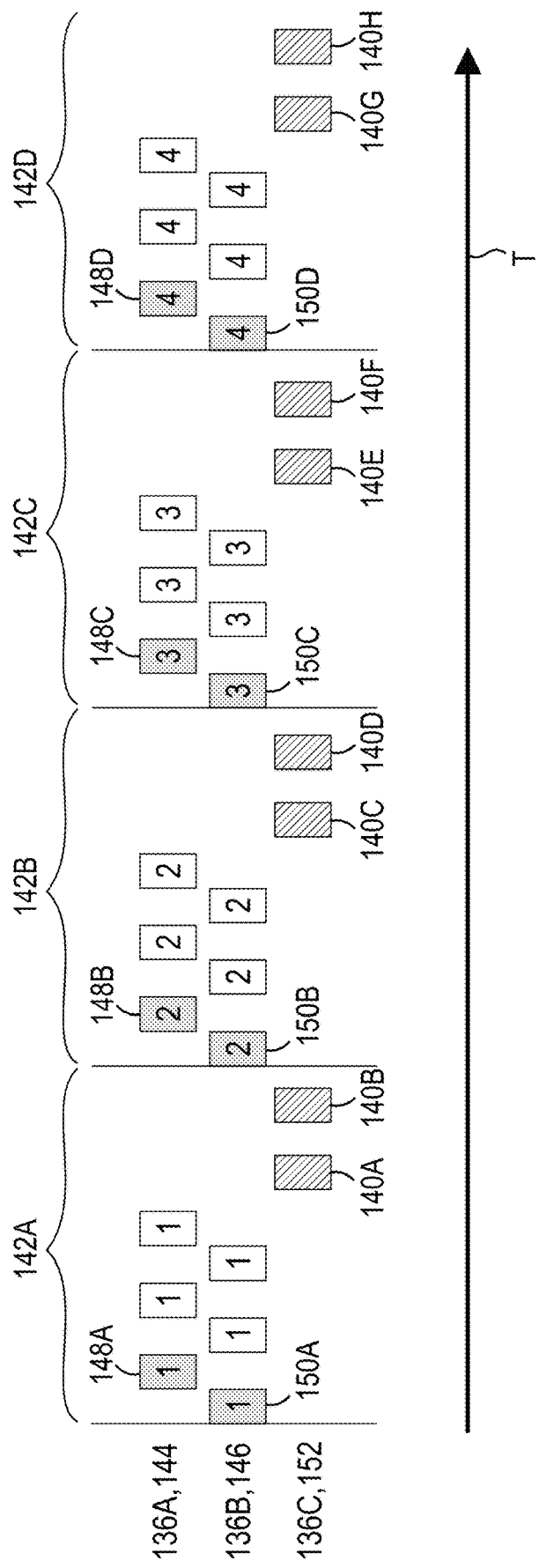
FIG. 5 is a schematic illustration of a wireless broadcast topology according to the present disclosure.

As shown in FIG. 5, the plurality of data packets 138 can include a first plurality of data packets 148A-148D (collectively referred to as "first plurality of packets 148") and a second plurality of data packets 150A-150D (collectively referred to as "second plurality of packets 150"). As illustrated, the first plurality of packets 148 are transmitted via a first isochronous stream, i.e., first broadcast isochronous stream 136A, while the second plurality of data packets 150 are transmitted via a second isochronous stream, i.e., second broadcast isochronous stream 136B. It should be appreciated that first broadcast isochronous stream 136A can be transmitted using a first frequency 144 while second broadcast isochronous stream 136B can be transmitted using a second frequency 146 different than the first frequency 144. Additionally, second plurality of packets 150 can be temporally shifted with respect to first plurality of packets 148 such that there is no temporal overlap in the airtime used to send each packet of the respective pluralities. Thus, a single radio, e.g., source radio 116, can be used to send both the first plurality of data packets 148 and the second plurality of data packets 150. The first plurality of data packets 148 include audio data or frames of audio data associated with a left-channel audio stream while the second plurality of data packets 150 include audio data or frames of audio data associated with a right-channel audio stream. In other words, for stereo applications, left-channel audio can be sent via a separate channel or frequency while right-channel audio can be sent via another separate channel or frequency. Similar to FIGS. 4A-4B, first plurality of data packets 148A-148D and second plurality of data packets 150A-150D are illustrated as shaded boxes with numbers 1-4, respectively, displayed thereon. Additionally, the retransmitted packets associated with each of these packets are illustrated as white boxes with corresponding numbers 1-4 displayed thereon. Furthermore, supplemental data packets 140A-140H are illustrated as boxes with cross-hatchings.

Similarly to the supplemental packets 140 described above with respect to FIGS. 4A-4B, supplemental data packets 140 can be sent via yet another separate channel or frequency. For example, a third isochronous stream, i.e., third broadcast isochronous stream 136C can be used to transmit supplemental data packets 140 via a third frequency 152, where the third frequency 152 is different from the first frequency 144 and the second frequency 146. Furthermore, supplemental packets 140 can be temporally offset or shifted with respect to both first plurality of packets 148 and second plurality of packets 150. By temporally shifting the first plurality of packets 148, the second plurality of packets 150, and the supplemental packets 140 with respect to each other and such that none of these packets are transmitted at the same time, a single radio, e.g., source radio 116, can be used to transmit all three isochronous streams 136A-136C.

In the example illustrated in FIG. 5, it should be appreciated that supplemental packets 140A-140H can include error correction code calculated based on one or more of the first plurality of packets 148 and/or one or more packets of the second plurality of packets 150. For example, within the each isochronous interval, one or more data packet of the first plurality of packets 148 and two retransmitted packets associated with each respective data packet 148 are sent within a first broadcast isochronous stream 136A while one or more data packets of the second plurality of packets 150 and two retransmitted packets associated with the each respective data packet 150 are sent within a second broadcast isochronous stream 136B. Following the transmission of these data packets and their respective retransmitted packets, and within each isochronous interval 142, two supplemental packets 140 are sent via a third broadcast isochronous stream 136C. within each isochronous interval, one of the two supplemental packets 140 can include error correcting code calculated based on one or more packets of the first plurality of packets 148 while the other supplemental packet 140 can be calculated based on one or more packets of the second plurality of packets 150. In other words, within each isochronous interval 142, two supplemental packets 140 are sent. The error correcting code within one of the two supplemental packets will be calculated based on the packets associated with the left-channel audio stream while the error correcting code in the other supplemental packet will be calculated based on packets associated with the right-channel audio stream. For example, as shown in FIG. 5, supplemental packet 140C can be calculated based on data packets 148A and 148B, while supplemental packet 140D can be calculated based on data packets 150A and 150B. In this way, should either of packets 148A or 148B be lost while the other is successfully received, supplemental packet 140C can recover or re-create the missing packet. Similarly, should either of packets 150A or 150B be lost while the other is successfully received, supplemental packet 140D can recover or re-create the missing packet.

Figure 6:
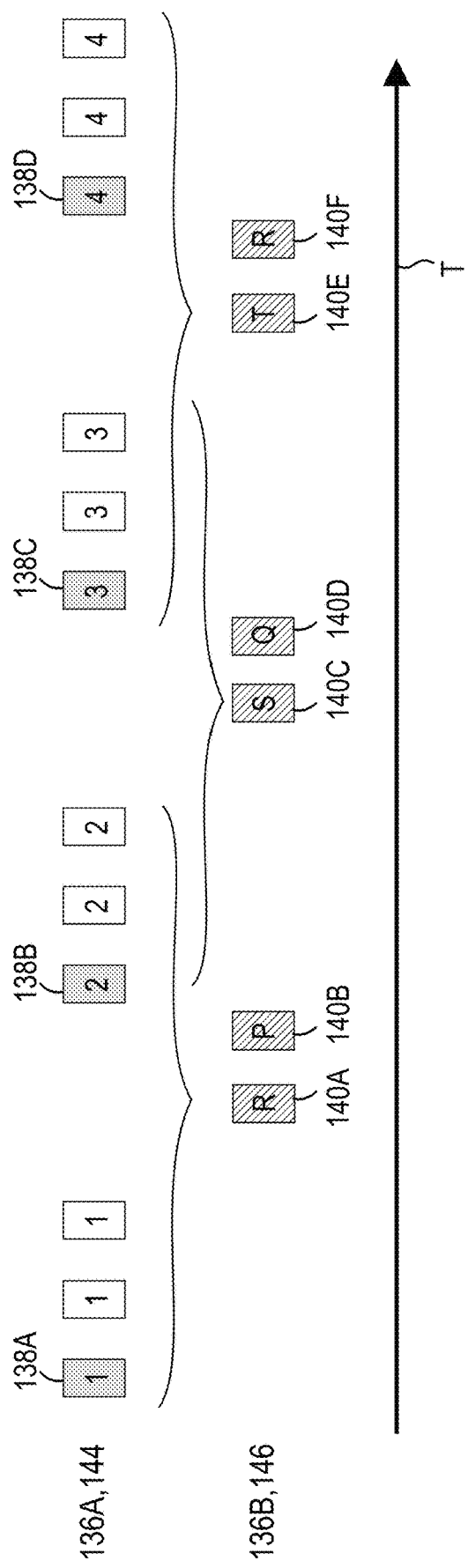
FIG. 6 is a schematic illustration of a wireless broadcast topology according to the present disclosure.

As shown in FIG. 6, supplemental packets can be sent in advance of one or more corresponding data packets or after the corresponding packets. For example, as shown, supplemental packet 140A (denoted as a cross-hatched square with the letter "R" displayed thereon) can contain error correcting code calculated based on the data of first packet 138A and second packet 138B. As supplemental packet 140A is sent temporally between first packet 138A and second packet 138B, supplemental packet 140A is said to be a pretransmission, i.e., it was sent temporally before at least one packet from which its error correcting code was calculated. As such, the first supplemental packet 140 sent within each isochronous interval 142 can be a pretransmitted packet with error correcting code calculated based on the packets sent immediately before it and the packets sent immediately after it within the first isochronous stream 136A. For example, supplemental packet 140C is calculated based on data packet 138B and data packet 138C and supplemental packet 140E is calculated based on data packet 140C and data packet 140D. It should be appreciated that the supplemental packets illustrated contain letters displayed on each representative square that signify progress through a sequential order of packets with an alphabetical display order. For example, supplemental packets 140A, 140C, and 140E contain sequential payloads denoted as R, S, and T to show that each of these supplemental packets are in a logical alphabetical order with respect to each other. To increase the robustness of the system discussed herein, the second supplemental packet 140 sent within each isochronous interval 142 can be a post transmission or post retransmitted packet in that each post retransmitted packet can be calculated based on one or more packets sent well in advance of the post retransmitted packet. For example, as shown, the payloads associated with the retransmitted packets can be shifted in time such that the payload being retransmitted is one or more full isochronous intervals in the future with respect to the data packets used to calculate the error correction code that it retains. For example, as shown in FIG. 6, the second supplemental packets 140 sent within each isochronous interval 142 are each calculated based on data packets sent at least two isochronous intervals previous to the sending of the corresponding supplemental packet 140. Specifically, as shown, supplemental data packet 140F is labelled with an "R" signifying that the payload within that supplemental packet is identical to the payload within supplemental packet 140A and that the error correcting code within these packets are calculated based on the data within packets 138A and 138B. As such, the post transmission of this payload occurs two isochronous intervals in the future with respect to the data packets used to calculate the error code contained within it. Additionally, in a pretransmission example, as one or more data packets 138 and one or more supplemental packets 140 have been received prior to a future data packet 138 from which the supplemental packet 140 was calculated, the present methods provide for methods of creating, in advance of receipt, the future packet 138 based on the first data packet received and the supplemental packet 140 from which it was calculated.

This example pre and post transmission configuration is advantageous in situations where packet loss is common or at the end of a particular link budget for the wireless connections described herein. For example, should the give connections experience interference within a particular isochronous interval, both the data packets 138 and the supplemental packets 140 able to aid in recovery of those data packets may be lost. By providing a post transmission several isochronous intervals in the future, there is an increased possibility that the interference that caused the initial packet loss is resolved and, given a large enough buffer, all packets originally lost may be recoverable. For example, as shown, should interference or other factors cause data packet 138A and supplemental packets 140A and 140B to be lost or missed, the post transmission packet 140F which contains the same payload as lost packet 140A will be sent at a different time in the future, where the interference has likely been resolved, and the post transmitted supplemental data can be used along with packet 138B to recover lost packet 138A.

In some examples, packet recovery using the methods described herein can be iterative. For example, with reference to FIG. 6, should interference or other environmental factors cause packets 138A, 138B, and 140A to be lost, the systems and methods described herein can begin with the recovery of packet 138B by using data from received packet 138C and received supplemental packet 140C. Once packet 138B is recovered, the system 100 can use recovered packet 138B and post transmission packet 140F to recover first packet 138A.

As mentioned above, it should be appreciated that the broadcast streams described in the present disclosure can utilize encryption to prevent unauthorized users from accessing the error correction and enhancement capabilities described herein. For example, source controller 106 can take the encoded data that will be sent via the broadcast isochronous stream associated with the supplemental packets 140 and encrypt each packet prior to broadcasting. The respective key of the key pair used to encrypt the data can be sent to an authorized sink device 104 prior to initiating the stream such that the sink controller 118 of an authorized device can decrypt the decoded data provided in the supplemental stream. In this way, for non-authorized users or non-authorized devices, the data associated with the first broadcast isochronous stream 136A will still be available, but the increased robustness created by the use of error correcting code and/or the increased quality of sending additional audio data within the supplemental packets 140 will not be available. In other words, in this example, the broadcast stream data associated with data packets 138 would not be encrypted while the broadcast stream data associated with with supplemental data packets 140 would be encrypted. In another example, both the broadcast stream data associated with data packets 138 and the broadcast stream data associated with with supplemental data packets 140 would be encrypted. For example, the broadcast stream associated with data packets 138 can utilize a first encryption key pair KP1 (shown schematically in FIGS. 2 and 3) while the broadcast stream associated with supplemental packets 140 would utilize a second encryption key pair KP2 different than the first encryption key pair KP1. In this way, for non-authorized users or non-authorized devices, the data associated with the first broadcast isochronous stream 136A will be available as long as the user or device has access to the respective key of the first encryption key pair KP1 used to decrypt the data associated with data packets 138, but the increased robustness created by the use of error correcting code and/or the increased quality of sending additional audio data within the supplemental packets 140 will only be available if the user or device has access to the respective key of the second encryption key pair KP2 used to decrypt the data associated with the supplemental data packets 140.

Additionally, it should be appreciated that, although illustrated as separate streams, the data packets 138 and the supplemental packets 140 described herein, can be sent within the same isochronous stream. With reference to FIG. 4A, for example, within the first isochronous interval 142A, packet 138A and its respective retransmitted packets can be sent. Immediately following the last retransmitted packet and within the first isochronous interval 142A, the system 100 can send supplemental packets 140A and 140B. The supplemental packets 140A and 140B will be temporally shifted with respect to packet 138A and the respective retransmitted packets so that a single radio, e.g., source radio 116, can be used to send all packets. It should be appreciated that in this example, packet headers will likely be required to instruct the sink controllers 118 of each sink device 104 on the type of data being sent in each packet of the first isochronous stream 136A. Furthermore, the examples provided herein describe using data contained in one or more supplemental packets, sent via a second broadcast isochronous stream, to recover, re-create, or enhance the data sent via a first broadcast isochronous stream. It should be appreciated that each packet 138 (or packets 148 and 150) can include multiple frames of audio data. As such, the error correction code and/or the additional data provided in the supplemental packets 140 can be calculated based on or applied to individual frames of data rather than each packet in their entirety. In other words, the one or more supplemental data packets 140 are used to re-create and/or enhance at least a portion (one or more frames) of one or more data packets 138 (or packets 148 and 150) of the plurality of data packets.

Although the descriptions above provide multiple broadcast isochronous streams, it should be appreciated that a similar concept can be employed on a non-broadcast system, e.g., using connected isochronous streams between the source device 102 and each sink device 104. If applied in a non-broadcast scenario, e.g., with connected isochronous streams, the system can include an additional interface to the source controller 106 to indicate which packets need to be acknowledged by the source controller 106 but not spend time on reception. In the non-broadcast examples, the systems described herein include acknowledging the successful recovery or recreation of one or more of the plurality of data packets 138. Thus, the systems described make it possible to re-create a packet that the sink devices 104 had difficulties receiving and sends an acknowledgement of the successfully recovery of that packet so that the system can continue to the transmission of the next packet the sink device needs.

Figure 7:
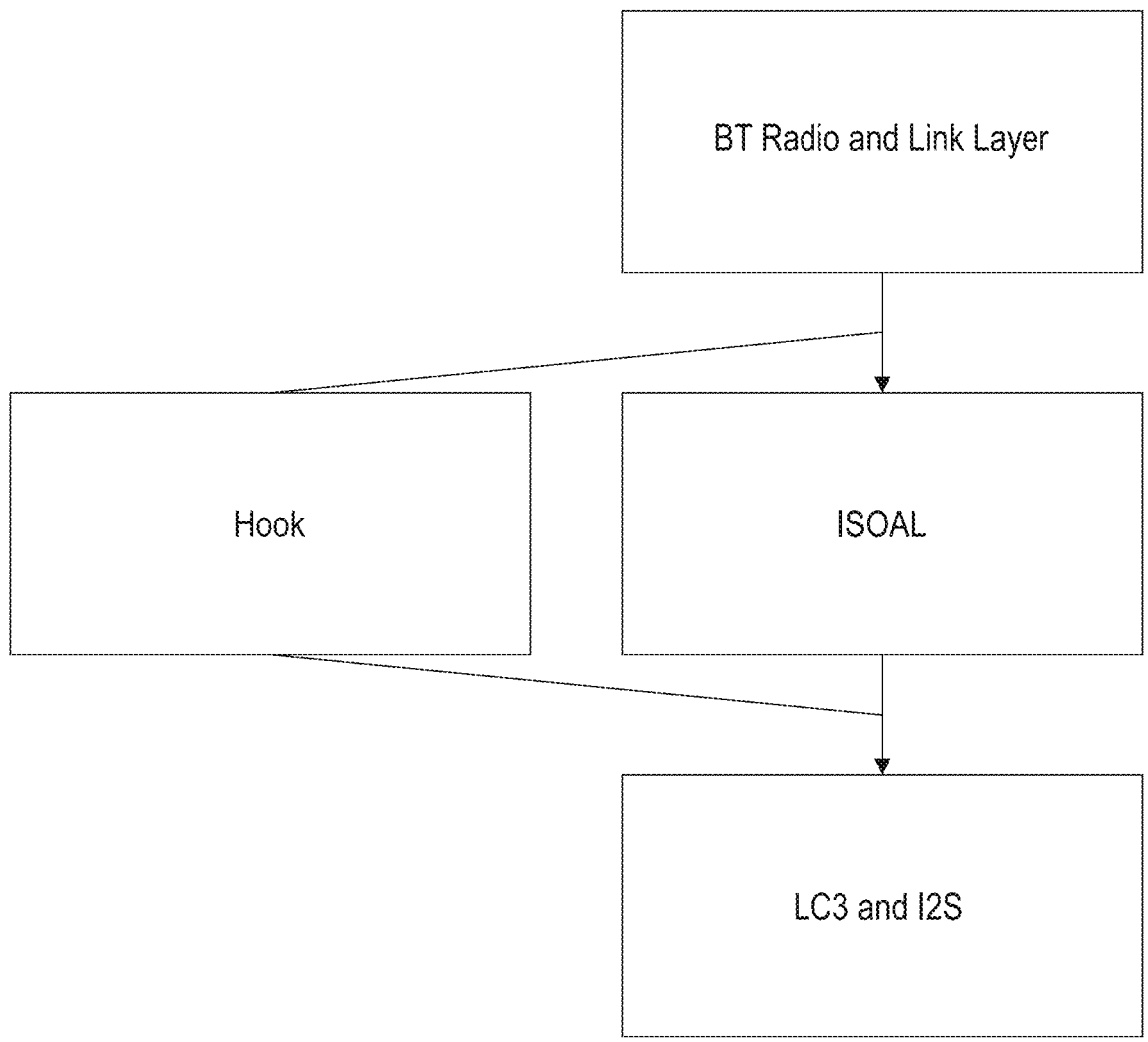
FIG. 7 is a schematic illustration of a logical stack including a schematic interface according to the present disclosure.

FIG. 7 illustrates the simplicity of implementation of the system and methods described herein. For example, a benefit of the configurations disclosed herein is that it does not require any changes to the Bluetooth Radio or Controller's currently used by source and sink devices for audio transmission. For example, the implementations described herein can be implemented by creation of an interface between the Isochronous Adaptation Layer (ISOAL) and the traditional LC3 encoder/decoder and I2S serial bus interface of typical audio source and sink devices. This interface is represented by a rectangle labelled "Hook" in FIG. 7. Additionally, when a packet is being calculated in advance the present system can utilize this interface to indicate to the source controller 106 which packets of the first isochronous stream 136A to pick up in advance. The same interface will be needed when the error correcting code is post transmitted and not needed.

Figure 8:
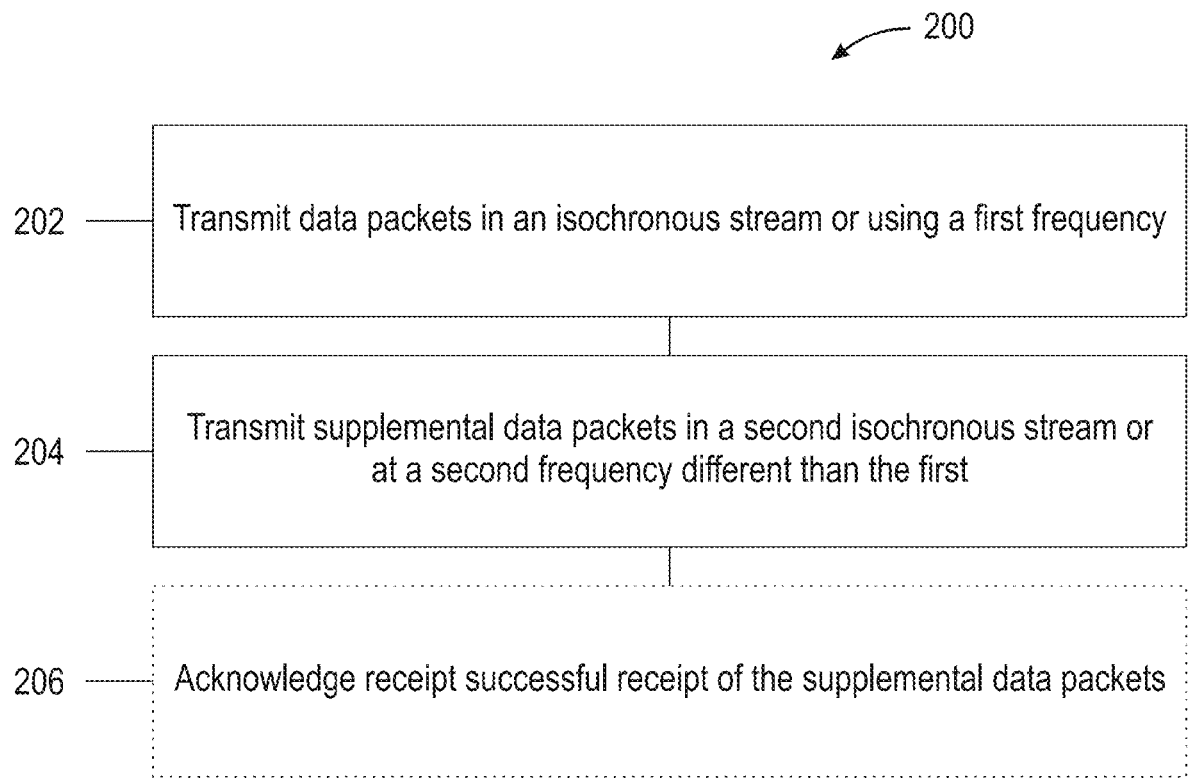
FIG. 8 illustrates the steps of a method according to the present disclosure.

FIG. 8 illustrates the steps of an exemplary method 200 according to the present disclosure. Method 200 includes, for example: transmitting an isochronous stream 136A, the isochronous stream including a plurality of data packets 138 (or 148 and 150) sent within a first isochronous interval 142A or using a first frequency 144 (step 202); and transmitting one or more supplemental data packets 140 within the first isochronous interval 142A and temporally shifted with respect to the plurality of data packets 138 (or 148 and 150) or at a second frequency 146 different that the first frequency 144 (step 204); wherein the one or more supplemental data packets 140 are used to re-create and/or enhance at least a portion of one or more data packets 138 of the plurality of data packets 138 that were received during the first isochronous interval 142A, or wherein the one or more supplemental data packets 140 are used to create and/or enhance at least a portion of the one or more data packets of the plurality of data packets 138 that will be received during the first isochronous interval 142A or during a second isochronous interval 142B after the first isochronous interval 142A. Optionally, method 200 can also include acknowledging a successful receipt of the one or more supplemental data packets 140 (step 206).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of improving wireless communications, the method comprising:
   transmitting a plurality of data packets within a first isochronous interval of an isochronous stream; and
   transmitting one or more supplemental data packets within the first isochronous interval, wherein the transmitting of the one or more supplemental data packets is shifted with respect to at least one of time or frequency relative to the transmitting of the plurality of data packets;
   wherein the one or more supplemental data packets are used to at least one of create, re-create, or enhance at least a portion of one or more data packets of the isochronous stream.

2. The method of claim 1, wherein the one or more supplemental data packets received during the first isochronous interval are used to at least one of create or enhance at least a portion of the one or more data packets of the plurality of data packets that will be received during the first isochronous interval or during a second isochronous interval after the first isochronous interval.

3. The method of claim 1, wherein the one or more supplemental data packets are used to re-create at least a portion of one or more data packets of the plurality of the data packets and wherein the one or more supplemental data packets include error correcting code related to at least one packet of the plurality of data packets.

4. The method of claim 3, wherein the error correcting code is related to at least one packet from the plurality of data packets received within the first isochronous interval and is related to at least one packet from the plurality of data packets sent during a second isochronous interval after the first isochronous interval.

5. The method of claim 3, wherein each of the plurality of data packets includes one or more audio frames of encoded audio data and wherein the one or more supplemental data packets are used to re-create at least one audio frame of the one or more audio frames.

6. The method of claim 3, wherein the plurality of data packets includes a first plurality of data packets associated with a left-channel audio stream and a second plurality of data packets associated with a right-channel audio stream and wherein a first supplemental data packet of the one or more supplemental data packets is related to the first plurality of data packets and a second supplemental data packet of the one or more supplemental data packets is related to the second plurality of data packets.

7. The method of claim 1, wherein the one or more supplemental data packets are used to enhance at least a portion of one or more data packets of the plurality of the data packets and wherein the one or more supplemental data packets include additional data related to at least one packet of the plurality of data packets.

8. The method of claim 1, wherein the isochronous stream is a broadcast isochronous stream or a connected isochronous stream.

9. The method of claim 8, wherein the isochronous stream is a connected isochronous stream, and wherein the method further comprises:
acknowledging a successful recovery of one or more of the plurality of data packets based on the one or more supplemental data packets.

10. The method of claim 1, wherein the one or more supplemental data packets are sent within the isochronous stream or within another isochronous stream that is time-related to the isochronous stream.

11. The method of claim 1, wherein the one or more supplemental data packets are encrypted using a first encryption key pair and wherein the one or more supplemental data packets are encrypted using a second encryption key pair different than the first encryption key pair.

12. A system for improving wireless communications, the system comprising:
a source device configured to:
transmit to at least one sink device, a plurality of data packets within a first isochronous interval of an isochronous stream; and
transmit one or more supplemental data packets to the at least one sink device within the first isochronous interval, wherein the transmission of the one or more supplemental data packets is shifted with respect to at least one of time or frequency relative to the transmission of the plurality of data packets;
wherein the one or more supplemental data packets are used to at least one of create, re-create, or enhance at least a portion of one or more data packets of the isochronous stream.

13. The system of claim 12, wherein the one or more supplemental data packets received during the first isochronous interval are used to at least one of create or enhance at least a portion of the one or more data packets of the plurality of data packets that will be received during the first isochronous interval or during a second isochronous interval after the first isochronous interval.

14. The system of claim 12, wherein the one or more supplemental data packets are used to re-create at least a portion of one or more data packets of the plurality of the data packets and wherein the one or more supplemental data packets include error correcting code related to at least one packet of the plurality of data packets.

15. The system of claim 14, wherein the error correcting code is related to at least one packet from the plurality of data packets received within the first isochronous interval and is related to at least one packet from the plurality of data packets sent during a second isochronous interval after the first isochronous interval.

16. The system of claim 14, wherein each of the plurality of data packets includes one or more audio frames of encoded audio data and wherein the one or more supplemental data packets are used to re-create at least one audio frame of the one or more audio frames.

17. The system of claim 14, wherein the plurality of data packets includes a first plurality of data packets associated with a left-channel audio stream and a second plurality of data packets associated with a right-channel audio stream and wherein a first supplemental data packet of the one or more supplemental data packets is related to the first plurality of data packets and a second supplemental data packet of the one or more supplemental data packets is related to the second plurality of data packets.

18. The system of claim 12, wherein the one or more supplemental data packets are used to enhance at least a portion of one or more data packets of the plurality of the data packets and wherein the one or more supplemental data packets include additional data related to at least one packet of the plurality of data packets.

19. The system of claim 12, wherein the isochronous stream is a broadcast isochronous stream or a connected isochronous stream.

20. The system of claim 19, wherein the isochronous stream is a connected isochronous stream, and wherein the source device is further configured to:
acknowledge a successful recovery of one or more of the plurality of data packets based on the one or more supplemental data packets.

21. The system of claim 12, wherein the one or more supplemental data packets are sent within the isochronous stream or within another isochronous stream that is time-related to the isochronous stream.

22. The system of claim 12, wherein the one or more supplemental data packets are encrypted using a first encryption key pair and wherein the one or more supplemental data packets are encrypted using a second encryption key pair different than the first encryption key pair.

* * * * *